United States Patent
Wagoner, Jr.

[11] Patent Number: 5,508,895
[45] Date of Patent: Apr. 16, 1996

[54] BOW LIGHT BRACKET

[76] Inventor: Roy D. Wagoner, Jr., Rte. 1, Box 154, Downsville, La. 71234

[21] Appl. No.: 492,454

[22] Filed: Jun. 20, 1995

[51] Int. Cl.$^6$ ..................................................... B60Q 1/00
[52] U.S. Cl. ........................ 362/61; 362/83.3; 362/396; 248/230.1
[58] Field of Search ............................. 362/61, 83.3, 396, 362/370, 250, 427, 430, 431; 248/230.1, 230.2, 230.6, 230.5, 122

[56] References Cited

U.S. PATENT DOCUMENTS

| | | | |
|---|---|---|---|
| 3,431,408 | 3/1969 | Roosevelt | 362/61 |
| 4,228,489 | 10/1980 | Martin | 362/250 |
| 4,884,173 | 11/1989 | Cassidy | 362/61 |
| 5,142,457 | 8/1992 | Wehner | 362/61 |
| 5,249,108 | 9/1993 | Gary | 362/145 |
| 5,335,149 | 8/1994 | Evans | 362/61 |

Primary Examiner—James C. Yeung

[57] ABSTRACT

A bow light bracket for a supplemental boat light is disclosed. The invention comprises an elongated strip of sheet material having a vertically extended lower portion, a horizontally extending upper portion and an offset vertically extending intermediate portion therebetween. An angled portion couples the upper extent of the lower portion and the lower extent of the intermediate portion. A pair of horizontal apertures extend through the lower portion at a lower extent thereof and at an intermediate extent thereof. A vertical aperture extends through a central extent of the horizontal portion. A pair of angled apertures extend through the intermediate portion adjacent its upper extent where it couples with the horizontal portion and adjacent its lower extent where it couples with the angled portion. A pair of brackets are provided, each with a concave intermediate section for being received on the vertical post extending upwardly from a forward portion of a boat. Each bracket also has an intermediate planar vertical section with a horizontal aperture alignable with a horizontal aperture in the lower portion of the strip and with aligned horizontal apertures extending through the ends of the brackets remote from the intermediate section. A bolt with a wing nut extends through the apertures at the ends of the brackets for tightening the brackets with respect to the post.

3 Claims, 4 Drawing Sheets

FIG 1
PRIOR ART
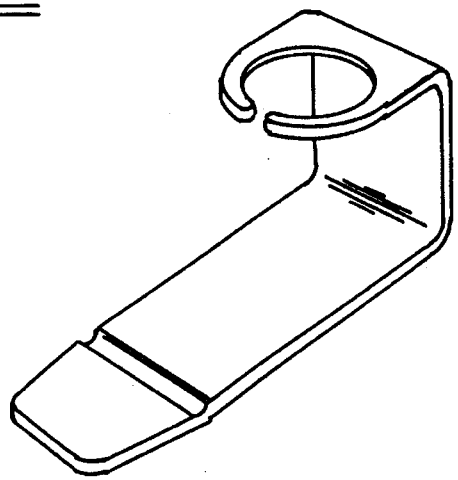
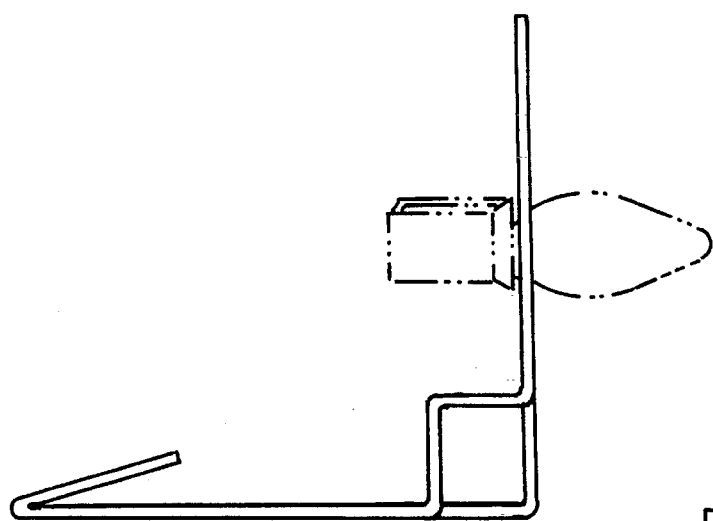
FIG 2
PRIOR ART

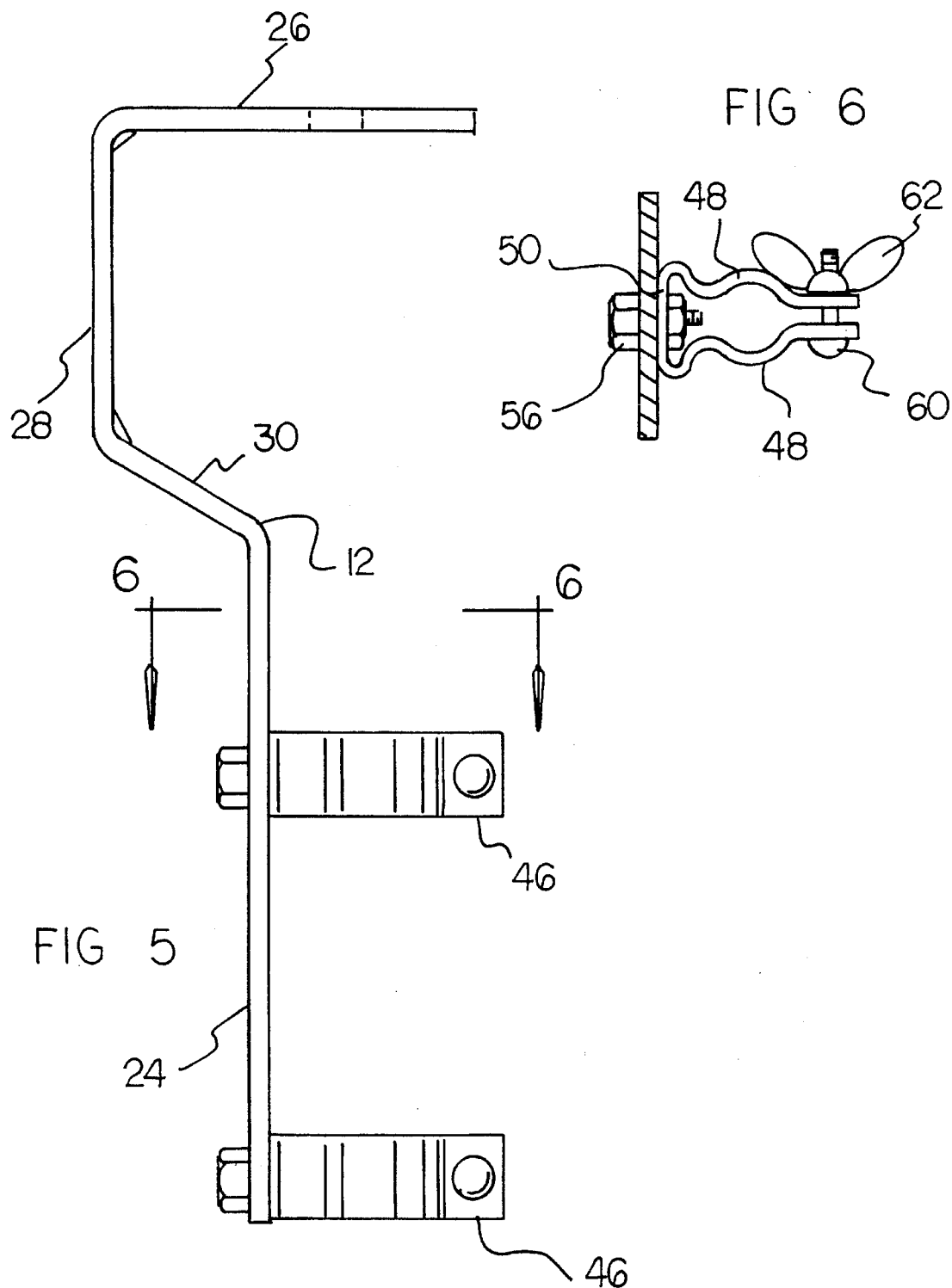

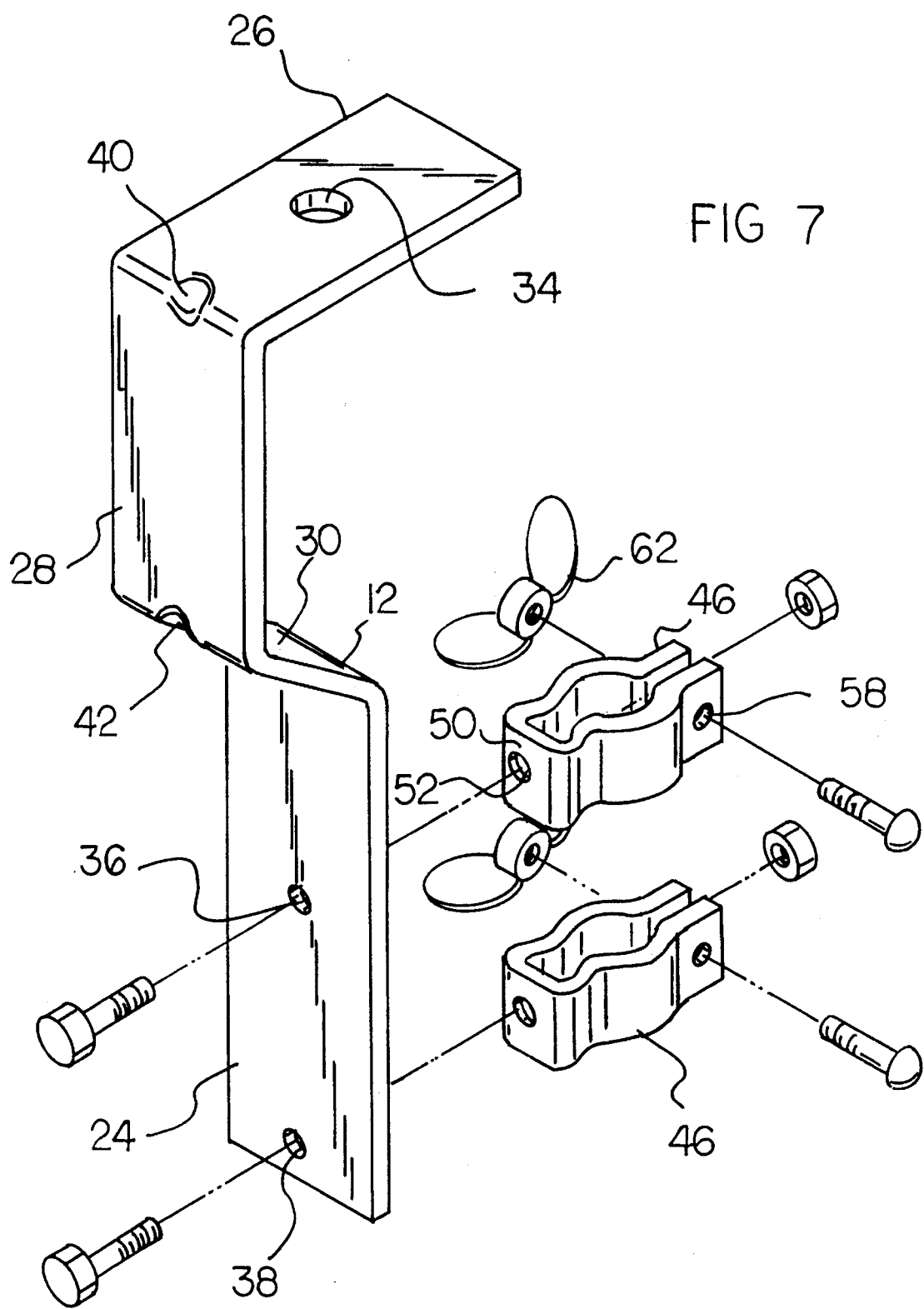

BOW LIGHT BRACKET

BACKGROUND OF THE INVENTION

1. Field of the Invention

The present invention relates to a new and improved bow light bracket and, more particularly, pertains to supplementing the illumination of the running light of a boat through a floodlight or spotlight mounted with respect to the running light on the bow of a boat.

2. Description of the Prior Art

The use of brackets, lamps, and brackets for lamps of a wide variety of designs and configurations is known in the prior art. More specifically, brackets, lamps, and brackets for lamps of a wide variety of designs and configurations heretofore devised and utilized for the purpose of providing supplemental illumination to regions where desired through a wide variety of methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for supplementing the illumination of the running light of a boat through a floodlight or spotlight mounted with respect to the running light on the bow of a boat. By way of example, U.S. Pat. No. 5,142,457 to Wehner discloses a boat spotlight apparatus.

U.S. Pat. No. 5,249,108 to Gary discloses a multiple-position decorative light bracket.

U.S. Pat. No. Des. 324,990 to Gary discloses a light support bracket.

U.S. Pat. No. Des. 325,866 to Gary discloses another design for a light support bracket.

Lastly, U.S. Pat. No. Des. 339,200 to Engel discloses an articulated spotlight support arm.

In this respect, the bow light bracket according to the present invention substantially departs from the conventional concepts and designs of the prior art, and in doing so provides an apparatus primarily developed for the purpose of supplementing the illumination of the running light of a boat through a floodlight or spotlight mounted with respect to the running light on the bow of a boat.

Therefore, it can be appreciated that there exists a continuing need for a new and improved bow light bracket which can be used for supplementing the illumination of the running light of a boat through a floodlight or spotlight mounted with respect to the running light on the bow of a boat. In this regard, the present invention substantially fulfills this need.

SUMMARY OF THE INVENTION

In view of the foregoing disadvantages inherent in the known types of brackets, lamps, and brackets for lamps of a wide variety of designs and configurations now present in the prior art, the present invention provides an improved bow light bracket. As such, the general purpose of the present invention, which will be described subsequently in greater detail, is to provide a new and improved bow light bracket and methods which have all the advantages of the prior art and none of the disadvantages.

To attain this the present invention essentially comprises, in combination with a running light of a boat, a new and improved bow light bracket for use as a supplemental boat light. A running light with a supporting vertical post thereebeneath is supported on the bow of a boat of a boat. An elongated strip of sheet material has a vertically extended lower portion, a horizontally extending upper portion and an offset vertically extending intermediate portion therebetween. An angled portion couples the upper extent of the lower portion and the lower extent of the intermediate portion. A pair of horizontal apertures extend through the lower portion at a lower extent thereof and at an intermediate extent thereof. A vertical aperture extends through a central extent of the horizontal portion. A pair of angled apertures extend through the intermediate portion adjacent its upper extent where it couples with the horizontal portion and adjacent its lower extent where it couples with the angled portion. A pair of brackets is provided, each bracket having a concave intermediate section for being received on the vertical post extending upwardly from a forward portion of a boat. Each bracket also has an intermediate planar vertical section with a horizontal aperture alignable with a horizontal aperture in the lower portion of the strip and with aligned horizontal apertures extending through the ends of the brackets remote from the intermediate section. A bolt with a wing nut extends through the apertures at the ends of the brackets for tightening the brackets with respect to the post. A pair of bolts with nuts extending through the apertures through the lower portion of the strip and the apertures in the intermediate sections of the brackets provide coupling therebetween during operation and use. Lastly provided is a lamp with a downwardly extending post positionable through the aperture in the horizontal portion of the strip for maintaining a spotlight in a proper orientation with respect to the boat and its running light.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bow light bracket which has all the advantages of the prior art brackets, lamps, and brackets for lamps of a wide variety of designs and configurations and none of the disadvantages.

It is another object of the present invention to provide a new and improved bow light bracket which may be easily and efficiently manufactured and marketed.

It is a further object of the present invention to provide a new and improved bow light bracket which is of a durable and reliable construction.

An even further object of the present invention is to provide a new and improved bow light bracket which is susceptible of a low cost of manufacture with regard to both materials and labor, and which accordingly is then susceptible of low prices of sale to the consuming public, thereby making such brackets, lamps, and brackets for lamps of a wide variety of designs and configurations economically available to the buying public.

Still yet another object of the present invention is to provide a new and improved bow light bracket which provides in the apparatuses and methods of the prior art some of the advantages thereof, while simultaneously overcoming some of the disadvantages normally associated therewith.

Even still another object of the present invention is to supplement the illumination of the running light of a boat through a floodlight or spotlight mounted with respect to the running light on the bow of a boat.

Lastly, it is an object of the present invention to provide a bow light bracket for a supplemental boat light. The invention comprises an elongated strip of sheet material having a vertically extended lower portion, a horizontally extending upper portion and an offset vertically extending intermediate portion therebetween. An angled portion couples the upper extent of the lower portion and the lower extent of the intermediate portion. A pair of horizontal apertures extend through the lower portion at a lower extent thereof and at an intermediate extent thereof. A vertical aperture extends through a central extent of the horizontal portion. A pair of angled apertures extend through the intermediate portion adjacent its upper extent where it couples with the horizontal portion and adjacent its lower extent where it couples with the angled portion. A pair of brackets are provided, each with a concave intermediate section for being received on the vertical post extending upwardly from a forward portion of a boat. Each bracket also has an intermediate planar vertical section with a horizontal aperture alignable with a horizontal aperture in the lower portion of the strip and with aligned horizontal apertures extending through the ends of the brackets remote from the intermediate section. A bolt with a wing nut extends through the apertures at the ends of the brackets for tightening the brackets with respect to the post. Lastly, a pair of bolts are provided with nuts extending through the apertures through the lower portion of the strip and the apertures in the intermediate sections of the brackets for coupling therebetween during operation and use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIGS. 1 and 2 are perspective and side views of lamp holding devices constructed in accordance with prior art designs.

FIG. 5 is a side elevational view of the bracket shown in FIGS. 3 and 4.

FIG. 6 is a cross-sectional view taken along line 6—6 of FIG. 5.

FIG. 7 is an exploded perspective view of the strip and bracket shown in FIGS. 3 through 6.

The same reference numerals refer to the same parts throughout the various Figures.

DESCRIPTION OF THE PREFERRED EMBODIMENT

Figure 3:
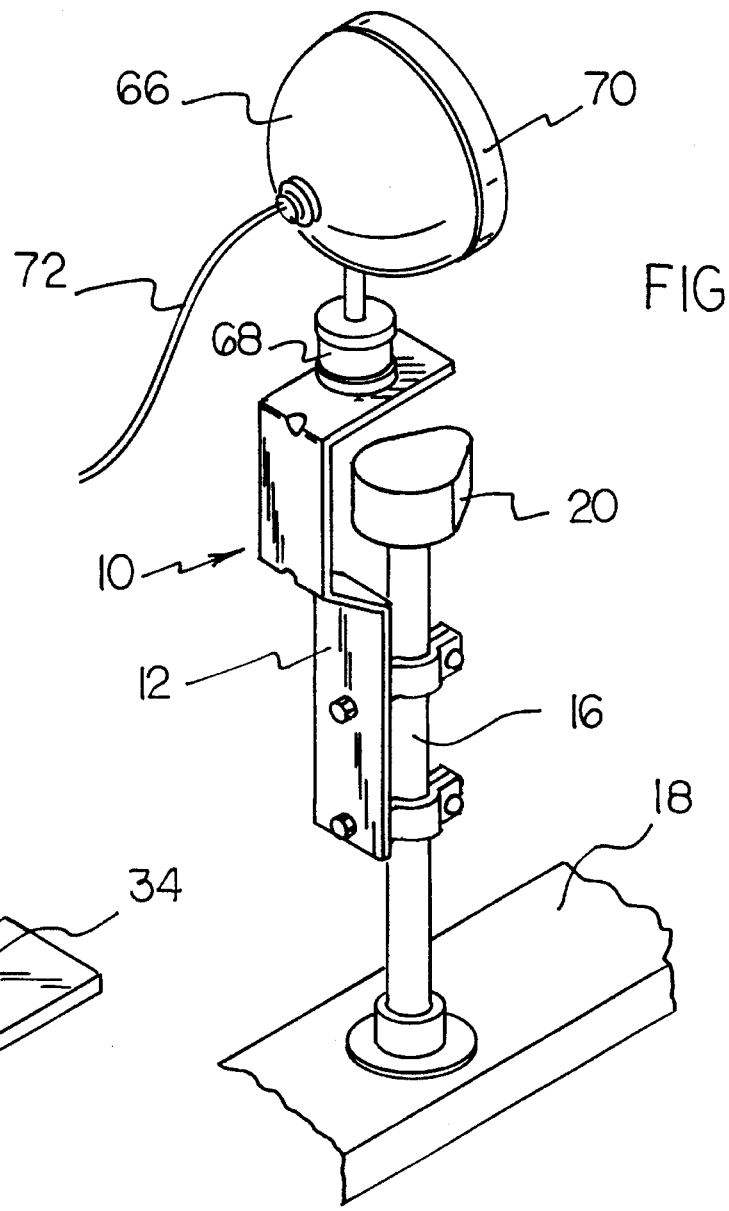
FIG. 3 is a perspective illustration of the preferred embodiment of the new and improved bow light bracket constructed in accordance with the principles of the present invention.
Figure 4:
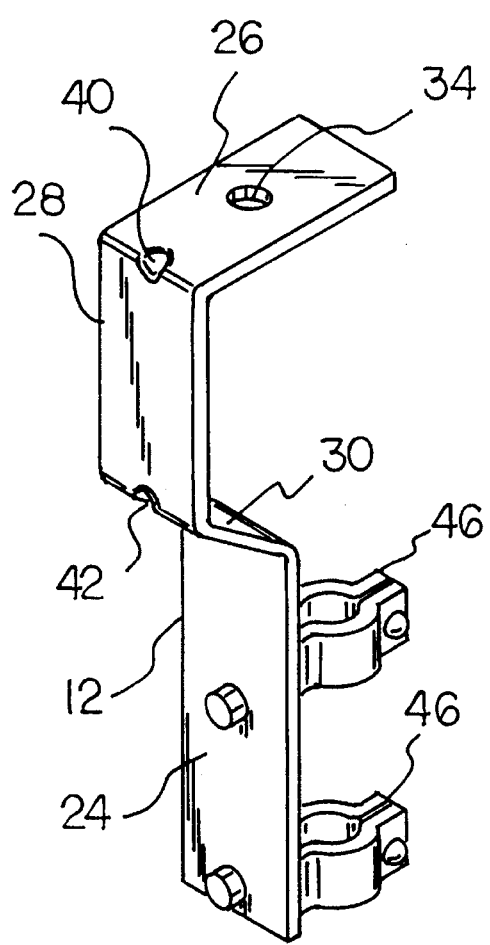
FIG. 4 is an enlarged perspective view of the strip of the bracket shown in FIG. 3.

With reference now to the drawings, and in particular to FIG. 1 thereof, the preferred embodiment of the new and improved bow light bracket embodying the principles and concepts of the present invention and generally designated by the reference numeral 10 will be described.

The present invention, the new and improved bow light bracket is a system 10 comprised of a plurality of components. In their broadest context, the components include a running lamp of a boat, a supporting strip with various sections and apertures, brackets and associated nuts and bolts. Each of the individual components is specifically configured and correlated one with respect to the other so as to attain the desired objectives.

More specifically, the present invention is in a system including a bracket 10. The combination invention also includes a running light 20 with a supporting vertical post 16. The post is located beneath the running light and is supported from beneath on the bow of a boat.

In association with the running light is an elongated strip 12. The strip is made of sheet material, preferably aluminum. Its function is to hold a supplemental lamp 70, a spotlight or a floodlight, with respect to the running light 20 on the bow of a boat.

The strip, which is formed to constitute a bracket when functioning with associated bolts and nuts, includes a vertically extending lower portion 24 and a horizontally extending upper portion 26. An offset vertically extending intermediate portion 28 is therebetween. In addition, an angled portion 30 couples the upper extent of the lower portion and the lower extent of the intermediate portion.

Next provided are a pair of horizontal apertures 36, 38. Such apertures extend through the lower portion of the strip at a lower extent thereof as well as an intermediate extent thereof. Such are for mounting the strip with respect to the running lamp as will be later described.

An additional aperture 34 is disposed vertically. Such aperture extends through a central extent of the horizontal portion of the strip. Its function is for supporting the supplemental lamp with respect to the running lamp as will be described hereinafter.

The final apertures are a pair of angled apertures 40, 42. Such angled apertures extend through the intermediate portion of the strip. They are located adjacent to its upper extent where it couples with the horizontal portion and adjacent to its lower extent where it couples with the angled portion. Such angled apertures are for providing stability to the strip when formed and to assist in the forming thereof.

In association with the strip are a pair of brackets 46. Each bracket has a concave intermediate section for being received about the vertical post 16 extending upwardly from a forward portion of the boat 18. Each bracket has an intermediate planar vertical section 50. A horizontal aperture 52 extends therethrough and is alignable with a horizontal aperture 36, 38 in the lower portion of the strip. In addition, alignable horizontal apertures 58 extend through the ends of the bracket remote from the intermediate section.

A bolt 60 with an associated wing nut 62 extends through the apertures 58 at the ends of the brackets. Such bolts and wing nuts are for tightening the brackets with respect to the post to assure retention in an intended orientation during operation and use. The nuts and bolts may be loosened and the strip raised or lowered or rotated for a particular application at the intent of the user.

Next provided are a pair of bolts 56 with associated nuts. Such bolts extend through the apertures 36, 38 in the lower portions of the strip. They also extend through the apertures 52 in the intermediate sections of the brackets 46. These bolts and nuts are for coupling between the brackets and strip during operation and use.

Lastly provided is a lamp 70. The lamp includes a downwardly extending post 68 positionable through the aperture in the horizontal portion of the strip. This is for maintaining the spotlight in a proper angular orientation with respect to the boat and its running light. An electrical line 72 couples the lamp 70 with a source of electrical potential for illumination of the lamp during operation and use.

The present invention comprises a device that mounts onto a motorboat's running light to hold a floodlight or spotlight for safer night boating. It consists of a mounting bracket made from an 0.125 inch thick aluminum strip, two conduit clamps, and fastening hardware. The overall length of the strip is about 11⅛ inches, with a two inch width, bent into four sections. The top is horizontal and three inches long, while the vertical back piece, extending from one end of the top piece, is also three inches long. Mounting holes, of ¼ inch in diameter, go through the four inch long vertical base piece. A short 45 degree angled section connects the base and back sections. A 9/16 inch diameter hole in the top is provided for a floodlight or spotlight. The two conduit clamps are fastened securely to the base piece, one near its top and one near the bottom. When installed on a boat, the clamps hold the bracket securely to the rod on which the running light is mounted.

The present invention is fastened tightly to the running light's support rod by the two conduit clamps with its open section facing forward. A floodlight or spotlight is mounted into the hole through its top, and the light's wires are connected to the power source.

The present invention enables the boat to have a light similar to that found on automobiles. It is a vast improvement over holding the light by hand, which often results in glare, as well as a tired hand. For anyone who boats at night, even if only occasionally, this is an ideal product.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. In combination with a running light of a boat, a new and improved bow light bracket for use as a supplemental boat light comprising, in combination:

a running light with a supporting vertical post therebeneath supported on the bow of a boat of a boat;

an elongated strip of sheet material having a vertically extended lower portion, a horizontally extending upper portion and an offset vertically extending intermediate portion therebetween and an angled portion coupling the upper extent of the lower portion and the lower extent of the intermediate portion;

a pair of horizontal apertures extending through the lower portion at a lower extent thereof and at an intermediate extent thereof;

a vertical aperture extending through a central extent of the horizontal portion;

a pair of angled apertures extending through the intermediate portion adjacent its upper extent where it couples with the horizontal portion and adjacent its lower extent where it couples with the angled portion;

a pair of brackets, each bracket having a concave intermediate section for being received on the vertical post extending upwardly from a forward portion of a boat, each bracket having an intermediate planar, vertical section with a horizontal aperture alignable with each of said horizontal aperture in the lower portion of the strip and with aligned horizontal apertures extending through the ends of the brackets remote from the intermediate section;

a bolt with a wing nut extending through the apertures at the ends of the brackets for tightening the brackets with respect to the post;

a pair of bolts with nuts extending through the apertures through the lower portion of the strip and the apertures in the intermediate sections of the brackets for coupling therebetween during operation and use; and a lamp with a downwardly extending post positionable through the aperture in the horizontal portion of the strip for maintaining a spotlight in a proper orientation with respect to the boat and its running light.

2. A bow light bracket for a supplemental boat light comprising:

an elongated strip of sheet material having a vertically extended lower portion, a horizontally extending upper portion and an offset vertically extending intermediate portion therebetween and an angled portion coupling the upper extent of the lower portion and the lower extent of the intermediate portion;

a pair of horizontal apertures extending through the lower portion at a lower extent thereof and at an intermediate extent thereof;

a vertical aperture extending through a central extent of the horizontal portion;

a pair of angled apertures extending through the intermediate portion adjacent its upper extent where it couples with the horizontal portion and adjacent its lower extent where it couples with the angled portion;

a pair of brackets, each bracket having a concave intermediate section for being received on the vertical post extending upwardly from a forward portion of a boat, each bracket having an intermediate planar vertical section with a horizontal aperture alignable with each of said horizontal aperture in the lower portion of the strip and with aligned horizontal apertures extending through the ends of the brackets remote from the intermediate section;

a bolt with a wing nut extending through the apertures at the ends of the brackets for tightening the brackets with respect to the post; and a pair of bolts with nuts extending through the apertures through the lower portion of the strip and the apertures in the intermediate sections of the brackets for coupling therebetween during operation and use.

3. The apparatus as set forth in claim 2 and further including a lamp with a downwardly extending post positionable through the aperture in the horizontal portion of the strip for maintaining a spotlight in a proper orientation with respect to the boat and its running light.

* * * * *